United States Patent [19]

Palmer et al.

[11] 4,379,798

[45] Apr. 12, 1983

[54] INTEGRAL WOVEN REINFORCEMENT FOR STRUCTURAL COMPONENTS

[75] Inventors: Raymond J. Palmer, Newport Beach, Calif.; Dominique Micheaux, Villette d'Anthon, France

[73] Assignees: McDonnell Douglas Corporation, Long Beach, Calif.; Brochier & Fils, Villeurbanne, France

[21] Appl. No.: 338,095

[22] Filed: Jan. 8, 1982

[30] Foreign Application Priority Data

Jan. 12, 1981 [FR] France ................................. 81 00498

[51] Int. Cl.³ .............................................. B32B 7/00
[52] U.S. Cl. .................................... 428/113; 428/114; 428/156; 428/257; 428/366; 428/367; 428/408; 428/542.8; 139/304; 139/409; 139/410
[58] Field of Search ............... 428/113, 114, 257, 366, 428/367, 408, 156, 542.8; 139/304 R, 409, 410

[56] References Cited

U.S. PATENT DOCUMENTS

| | | |
|---|---|---|
| 2,562,951 | 8/1951 | Rose et al. |
| 2,778,761 | 1/1957 | Frieder et al. |
| 2,789,076 | 4/1957 | Frieder et al. |
| 2,934,097 | 4/1960 | Hindle et al. |
| 3,203,849 | 8/1965 | Katz et al. |
| 3,502,171 | 3/1970 | Cowan |
| 3,647,606 | 3/1972 | Notaro |
| 3,769,142 | 10/1973 | Holmes et al. |
| 4,095,619 | 6/1978 | Kollmeyer et al. |
| 4,131,708 | 12/1978 | Moores et al. |
| 4,193,828 | 3/1980 | Moores et al. |

OTHER PUBLICATIONS

PCT Publication No. WO80/02254, Oct. 30, 1980.

*Primary Examiner*—Marion McCamish
*Attorney, Agent, or Firm*—Max Geldin

[57] ABSTRACT

Three-dimensional non-crimp integral woven reinforcement for structural components formed as an integral woven assembly of warp and fill fibers, e.g. graphite fibers, in a multiplicity of layers, with light weight tie yarn, e.g. of fiberglass, passing from one side of the layered system to the other. Woven reinforcement forms of various shapes such as an I-beam can be produced by using a specified percentage of 0° (warp) fibers and 90° (fill) fibers, e.g. of graphite, to form a plurality of layers comprising the web and flanges of the I-beam reinforcement, and having the desired number of layers and thickness in both the web and flanges, and passing tie yarn, e.g. of fiberglass, back and forth from one side of the web to the other, and in the same manner from one side of the flanges to the other, and extending lengthwise in the warp direction of the material. The woven assembly is then impregnated with resin, e.g. "B" stage epoxy resin, located on a suitable mold, and heated and cured in the conventional manner.

21 Claims, 13 Drawing Figures

INTEGRAL WOVEN REINFORCEMENT FOR STRUCTURAL COMPONENTS

BACKGROUND OF THE INVENTION

This invention relates to the production of woven fiber reinforcements for structural components, and is particularly concerned with the provision of a three-dimensional non-crimp integral woven fiber reinforcement for structural components, such woven reinforcement being subsequently impregnated with a resin, followed by curing the resin to form the structural component.

Most shaped structural type composite parts are made from multiple plies or layers of "B" stage epoxy resin impregnated woven cloth or unidirectional type fiber (graphite, boron, Kevlar, fiberglass, or mixture of such materials). Shaped parts such as channels, I-beams, "J" sections, etc. are laid up one layer at a time on a tool until the total number of plies have been positioned to a prescribed fiber ply orientation pattern. This layered assembly is then impregnated with resin and cured under heat and pressure by conventional processes, dependent on the resin system in use. These fiber reinforced resin or plastic components have numerous applications, particularly as structural components in airplanes, ships and automobiles.

However, the individual ply-by-ply layup time for assembling a required fiber pattern is time-consuming and expensive, and further is subject to human error in fiber ply count and fiber ply orientation.

Many prior art patents disclose the production of various forms of woven and unwoven materials or cloths which are impregnated with resin. Many of the resin impregnated structures so produced, however, are not designed for use as high strength structural components, but are employed in other applications, for example as acoustic materials.

Thus, for example, U.S. Pat. No. 3,481,427 describes a three-dimensional woven fiberglass fabric which when impregnated with resin and cured, gives a rigid porous panel structure for acoustic requirements. A sandwich with porous skin on one side and solid skin on the other side, and connecting fluted webs, can be woven at once. The weaving is in the form of an over-/under pattern that is not optimized for strength but for sound absorption.

U.S. Pat. No. 3,700,067 describes a three-dimensional woven porous face sheet formed from an integrally woven fiber which when impregnated with a low flow resin and cured, gives a rigid yet porous panel. Its intended use is sound absorption.

It is accordingly an object of the present invention to provide a woven fiber reinforcement as an integral assembly, which can be impregnated with resin and employed as a structural component. Another object of the invention is to provide a three-dimensional non-crimp woven fiber reinforcement as an integral assembly or unit, which can be impregnated and cured to form structural components. Yet another object is the provision of the above noted three-dimensional woven fiber reinforcement in one piece, which can be formed into various types of structural shapes, such as an I-beam, such woven reinforcements having high modulus and high strength. A still further object of the invention is to provide the above noted woven fiber reinforcements in an integral shape by inexpensive and simple, e.g. automated, weaving operations.

SUMMARY OF THE INVENTION

The above objects are achieved according to the invention by the provision of an integral three-dimensional woven reinforcement member for structural components which comprises a woven assembly of warp and fill fibers, e.g. graphite fibers, in a multiplicity of layers, and forming a layered assembly, such warp and fill fibers of the respective layers being secured together as an integral woven structure with tie yarn, preferably of light weight, e.g. fiberglass, which pass back and forth from one side of the layered assembly to the other side thereof, and extending lengthwise of the member. The resulting integral woven high strength/stiffness shaped material of multi-ply thickness is then impregnated as a unit with resin, located on a suitable mold and the resin cured to form the desired structural component.

Thus, a woven reinforcement or structural shaped cloth, e.g. in the shape of an I-beam, can be integrally woven having a specified percentage of 0° (warp or length) fibers and 90° (fill or transverse) fibers, formed of high modulus fibers such as graphite or boron, to form a plurality of layers comprising the web and flanges of the I-beam reinforcement, and having the desired number of layers and thickness in both the web and flanges. The percentage of fibers in the warp 0° direction and the fill 90° direction, as well as the number of fibers in each direction, can be varied to obtain the desired thickness and mechanical properties in the woven structure. Tie yarn, such as fiberglass, is woven back and forth through the layers of warp and fill fibers, from one side of the layered assembly to the other in the 0° direction along the length of the web and in the same manner along the length of the flanges at opposite ends of the web. The spacing of the tie yarn can be varied to obtain the desired feel, drape and secureness desired in the integral cloth.

The resulting integral woven three-dimensional fiber reinforcement, cut to the required length, and preferably together with a pair of woven end caps in contact with the opposite flanges of the I-beam structure, as described in greater detail hereinafter, can be impregnated, e.g. with "B" stage epoxy resin, located on a suitable mold and cured by conventional procedure to form an I-beam structural component.

Other three-dimensional woven shapes such as a "J" section, at section or channel, can be woven in one piece as noted above, cut to length, impregnated with resin, laid on a tool and cured, to obtain corresponding structurally shaped components of high modulus, high strength, and high quality.

The advantages of the invention include the simplicity of formation of the integral woven fiber reinforcement, thus minimizing the chance for human error when assembling a plurality of plies for producing fiber reinforcement shapes, by improper ply count or wrong fiber orientation. The invention fiber reinforcements also reduce manufacturing costs as a result of elimination of ply-by-ply layups. The integral woven high strength/stiffness shaped material or cloth, of multi-ply thickness can be impregnated with resin at one time, thus reducing impregnation costs wherein multiple individual layers of material are resin impregnated and then laid up ply-by-ply.

THE DRAWINGS

The invention will be more fully described hereinafter in connection with the accompanying drawings, wherein:

FIG. 7 is a perspective view showing the details of the end cap illustrated in FIG. 1 and to which the flanges of the I-beam are connected; and FIGS. 7, 8, 9, 10, 11, 12 and 13 show the formation of a three-dimensional woven fiber reinforcement, preshaped into an I-beam, "J" section, hat section, channel and T-section.

DETAILED DESCRIPTION OF PREFERRED EMBODIMENTS OF THE INVENTION

Figure 1:
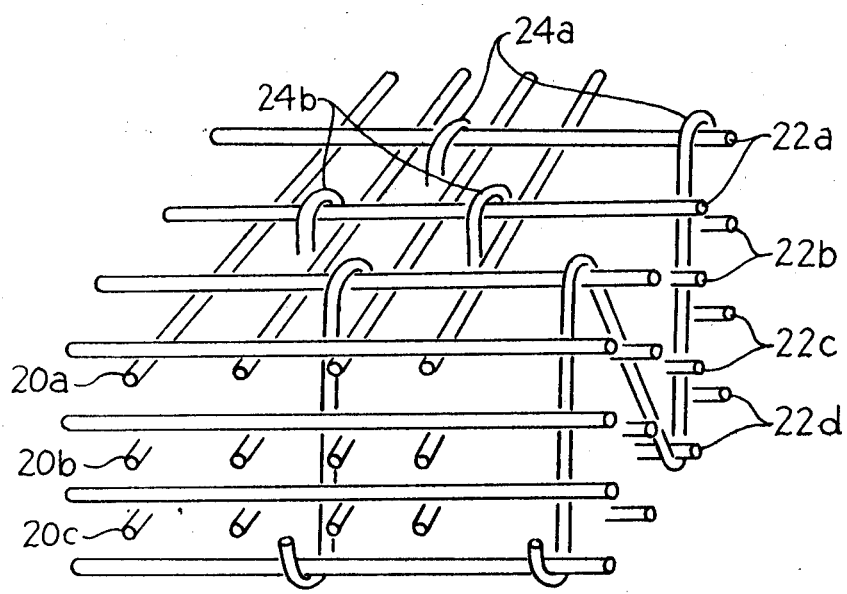
FIG. 1 is a schematic view in perspective of a textile article in three-dimensional form showing the structure corresponding to the invention.

Referring to FIG. 1, the three-dimensional woven cloth, according to the invention, consists of a series of three threads within the fabric, disposed in three different directions generally perpendicular to each other.

According to the invention, two directions are formed by fibers 20a, 20b and 20c in the warp directions, and fibers 22a, 22b, 22c and 22d in the fill direction, and superimposed in parallel planes. Those threads do not intersect and the upper fibers as well as the lower fibers of this stacking consist of planes of fill 22a through 22d. In this type of material, the third direction is formed by the tying warp threads 24a, 24b, which pass through the stack of the above-mentioned layers, those tying threads being bent over the fill threads 22a and 22d in such a manner that they cooperate with those of a conventional fabric, internally tying the layers of warp and fill 20a, 20b, 20c.

In the form of the invention shown in FIG. 1, the tying threads 24a and 24b cooperate with the fill threads of the upper and lower planes to form a ridged texture and it is obvious that this is not a limitation and that many other types of weaving could be envisioned. For example, the tying warp threads could be disposed in the same fashion and not in the staggered manner as described in FIG. 1.

Such a material may be made on a conventional weaving machine, with the establishment of warp threads 20 being installed in such a manner that the fill 22 can be inserted in a linear manner between the longitudinal warp threads according to a determined pattern, in order to obtain superimposed layers that do not intersect with each other. In this example, the fill threads 22a, 22b, 22c and 22d are aligned in parallel planes, whereas the warp threads 20a, 20b and 20c are also horizontally aligned with respect to the above-mentioned fill threads. Moreover, the displacement of the tying warp threads 24 is realized in such a manner that those threads pass around the fill threads of the external layers 22a and 22b in order to form a conventional fabric, internally tying together the layers of warp and fill. If material is created with a parallel transversal form, it is particularly well suited for woven textile articles which may, after weaving, be made into various configurations, such as those similar to the letters I, J, T or omega.

Figure 2:
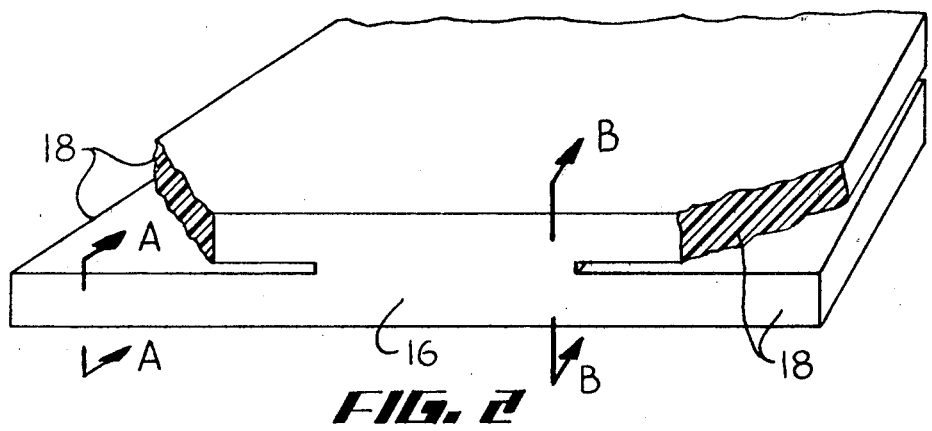
FIG. 2 is a schematic representation in perspective of a textile article in three-dimensional form showing the elements of the reinforcement in a form per FIG. 1.

A material that may be made to look like an "I" is schematically illustrated in FIG. 2. In this example, according to the invention, the fabric consists of a central zone 16 bifurcated into two elementary portions 18 along its edges. The tying of layers of warp and fill threads, composing the central zone 16, is made by tying warp threads covering the entire thickness of the material. The tying of the layers in the portions 18 is made in the same manner by tying warp threads through each web.

Referring to FIGS. 3 to 6 of the drawings, numeral 12 illustrates an integral non-crimp woven fiber reinforcement in the form of an I-beam or I-section, according to the invention. Such woven I-beam reinforcement of the present embodiment comprises a total of ten plies 14 of woven material forming the web 16 of the I-beam, the ten plies of woven material being separated into five plies at opposite ends of the web 16 to form a pair of flanges 18 at opposite ends of the web 16.

Figure 5:
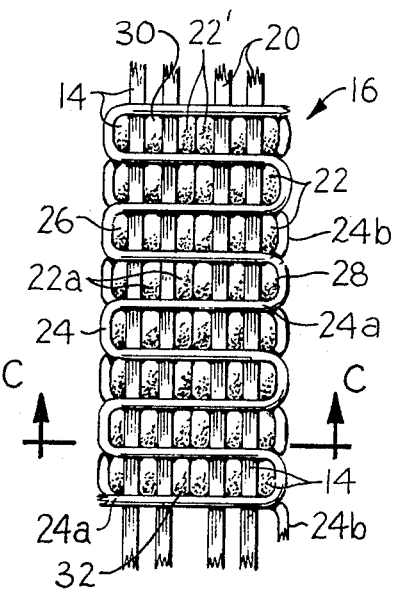
FIG. 5 is a horizontal section through the web of the I-beam, taken on line B—B of FIG. 3.

The ten plies 14 forming the web 16 are woven employing a fiber orientation consisting of 0° (warp) fibers 20 extending lengthwise, and 90° (fill) fibers 22 extending in the transverse or width direction. Such warp and fill fibers are preferably high modulus fibers such as graphite or boron fibers, but also can be fiberglass, carbon, silicon or organic fibers such as Kevlar, understood as comprised of poly (paraphenylterephthalamide). It will be noted that the ten plies 14 of fibers in the web 16, viewing FIG. 5, is comprised of four spaced warp fibers 20 and six fill fibers 22 between the warp fibers, with two fill fibers 22' adjacent each other forming the two inside plies of the arrangement.

A light weight tie yarn 24 of fiberglass or organic fiber such as Kevlar or a polyester such as Dacron is woven back and forth from one side 26 of the layered assembly comprised of the ten plies or layers of warp and fill fibers, to the other side 28 of such layered assembly, and extending lengthwise, that is in the warp direction from one end 30 of web 16 to the opposite end 32 thereof. The tie yarn 24 between adjacent passes thereof through the thickness of the ten plies of web 16, as illustrated at 24a and 24b, secures or ties together aligned rows of fill fibers, as indicated at 22.

An example of high modulus fibers which can be employed are the graphite fibers Thornel 300, each fiber or thread containing 3,000 filaments. An example of low modulus tie yarn is E-glass having a twist of 80 revolutions per meter.

Figure 4:
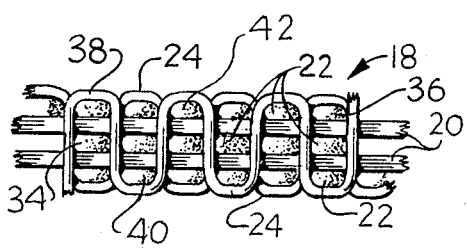
FIG. 4 is a vertical section of the I-beam flange, taken on line A—A of FIG. 3.

It will be noted that the flanges 18 extending integrally from opposite ends of the web 16, are each comprised, as illustrated in FIG. 4 of the drawing, of five plies or layers of warp and fill fibers 20 and 22, respectively, including two spaced layers of warp fibers 20 extending lengthwise of the flange 18 from one end 34 thereof to the opposite end 36 thereof. The warp fibers 20 of the flange 18 are spaced apart, and three layers of fill fibers 22 are woven between the warp fibers 20 of the flange and on opposite sides thereof to form the five plies or layers of the flange. A lightweight tie yarn 38, similar to tie yarns 24, and comprised of fiberglass or an organic material such as Kevlar, passes from one side 40 of the flanges 18 to the opposite side 42 thereof, and extending from one end 34 of the flanges to the opposite end 36 thereof.

It will be noted that a plurality of spaced tie yarns 24 are employed in weaving the web 16 and a plurality of spaced tie yarns 38 are woven into the flanges 18. The spacing of the tie yarns 24 in the web and the spacing of the tie yarns 38 in the flanges can be varied to obtain the desired feel, shape and secureness desired in the assembly.

It will also be noted that the number of plies of warp 20 and fill 22 fibers can be varied to obtain the desired thickness and strength of the structure. In addition, the ratio of warp 20 to fill 22 fibers can be adjusted to obtain greater or less strength or stiffness in a desired direction.

Figure 6:
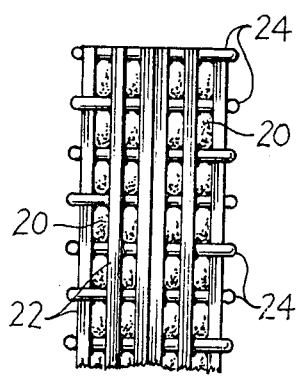
FIG. 6 is a vertical section through the I-beam web, taken on line C—C of FIG. 5.

It will be noted that the five ply assemblies forming the flanges 18 at opposite ends of the web 16 are a continuation of the ten ply assembly forming the web 16, and the entire assembly when woven forms an integral double Y-shaped woven cloth structure 43, as seen in FIG. 6, comprised of web 16 and flanges 18 extending from opposite ends of the web. The flanges 18 at opposite ends of web 16 can then be folded down horizontally, as illustrated in FIG. 1 and in the second figure of FIG. 6 to form the I-section 12. Thus, each of the flanges 18 of the I-beam comprises half the number of layers of the web 16.

Figure 3:
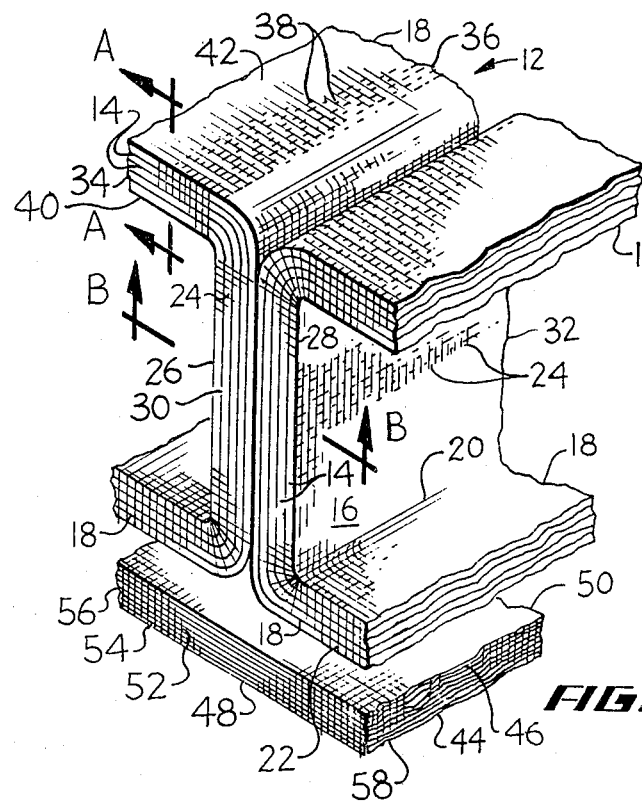
FIG. 3 is a prospective view of an integral woven reinforcement in the shape of an I-beam, employed in connection with an end cap.
Figures 7, 8:
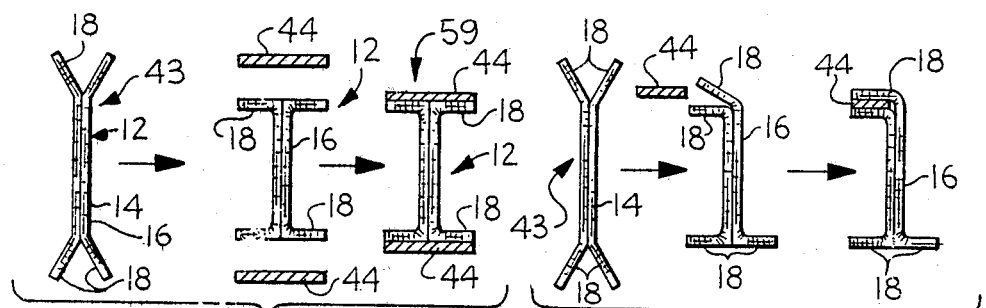

Referring to FIGS. 3 and 7, a woven reinforcing cap 44 can be assembled for placement in contact with the outer surfaces of the end flanges 18. Such reinforcing caps are woven of high modulus 0° (warp) fibers 46 extending lengthwise from one end of 48 of the cap 44 to the opposite end 50 thereof, forming, for example, eight layers or plies as seen in FIG. 3, the respective layers of warp fibers 46 being secured together by sets of double tie yarns 52 and 54 which are woven in opposite directions in contact with each other and extending laterally at 90° from one side 56 of cap 44 to the opposite side 58 thereof. The respective sets of tie yarns 52 and 54 are spaced from each other to provide the desired secureness of the warp fibers 46.

Referring again to FIG. 7, second figure, it is seen that the caps 44 are positioned adjacent the webs 18 at the top and bottom of the I-beam 12, and caps 44 are then placed in contact with the flanges 18 as seen in the last figure to the right of FIG. 7. This woven three piece assembly 59 comprised of the I-beam 12 and two caps 44 is impregnated with a suitable resin, e.g. a "B" stage epoxy resin, placed in a suitable tool and the assembly is cured by a procedure known in the art employing suitable heat/pressure/time processing techniques. Thus, in the case of an epoxy resin, final curing temperature can range from about 250° F. to 350° F. at pressures of about 50 to about 100 psi, the curing time ranging from about 30 minutes to about 2 hours, depending upon the curing temperature and resin catalyst system.

Referring to FIG. 8, the woven assembly 43 formed of web 14 and the outwardly extending Y-shaped flanges 18 can be formed into a J-section by extending the pair of flanges 18 at the lower end in a horizontal direction and bending the pair of flanges 18 at the upper end towards each other, and inserting a woven cap 44 between the flanges 18 at the upper end of the assembly to form the final woven J-section indicated at 60.

Figure 9:
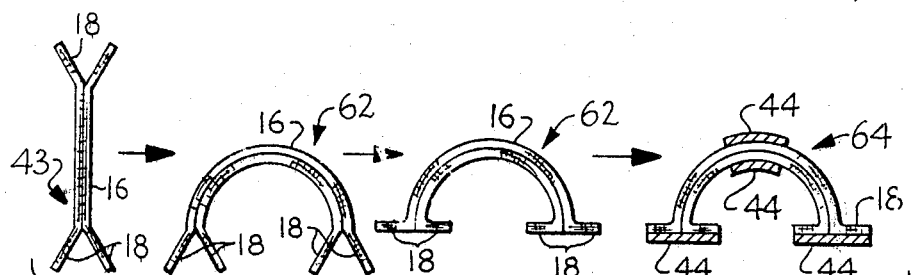

Further, it is seen in FIG. 9, that assembly 43 can be bent into a semicircular shape 62, with the outwardly extending pairs of flanges 18 at the opposite lower ends, as shown in the second figure in FIG. 9. The flanges 18 are then bent into horizontal position and woven caps 44 positioned in contact with the flanges 18 at opposite ends of the semicircular-shaped member, with similarly woven caps 44 positioned at the top and bottom at the center of the curved portion of the semicircular shaped member to form a woven hat section 64.

Figures 10, 11:
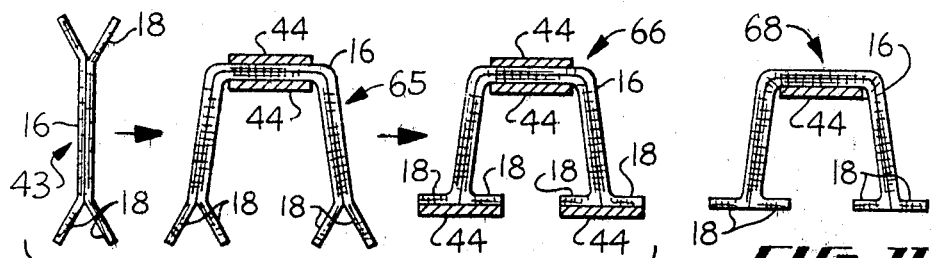

In the embodiment illustrated in FIG. 10, the integral woven fiber reinforcement 43, including the web 16 and the outwardly extending Y-shaped flanges 18, is bent into the form of a channel, as indicated at 65 in the second figure to the right in FIG. 10, with woven reinforcing caps 44 placed in contact with the upper and lower surface of the central portion of the web 16. The pairs of flanges 18 at opposite ends of the web 16 are then bent into horizontal position and woven reinforcing caps 44 are then placed in contact with the horizontally disposed flanges 18, as seen in the third figure to the right in FIG. 10, forming a cap reinforced channel section 66.

Alternatively, the channel section 65 may be reinforced with a single woven cap 44 in contact with the web 16, as illustrated in FIG. 11, forming the channel section 68.

Figure 12:
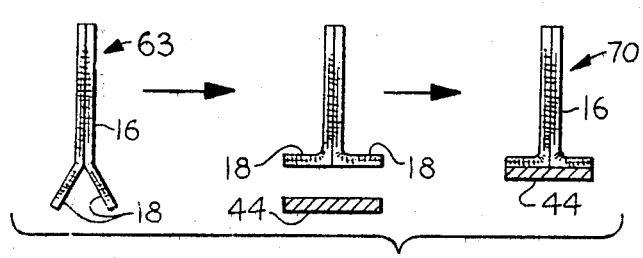

FIG. 12 shows an integral woven structure 63 which is similar to 43, but only has one pair of flanges 18 connected to the lower end of the web 16. The flanges 18 are bent into horizontal position, as seen in the second figure in FIG. 11 and woven cap 44 is then positioned in contact with flanges 18 to form a woven T-section 70.

Figure 13:
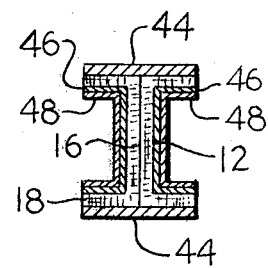

Finally, FIG. 13 illustrates a beam which consists of a textile element 12 (web), according to the invention, whose ends 18 have been folded to produce an I-configuration. The reinforcement elements 44 are fixed to the external parts of ends 18. Moreover, in the central portion (web), complementary reinforcement fabric 46 and 48 may be applied, and may be made from conventional, bidirectional cloth with a variety of different thread orientations.

As in the case of the I-beam 60, the integral woven structural shaped materials including the "J" section 62, the hat section 64, the channel sections 66 and 68, and the T-section 70 can be positioned on a tool or mold to "lay up" a complete shape, and the shaped reinforcement impregnated with resin, such as "B" stage epoxy resin, and cured to form the desired corresponding structural shape.

It will be understood that the reinforcing caps 44 need not be utilized, and if desired the integral woven reinforcement members per se, that is, the I-section, J-section, hat section, channel and T-section, in the absence of any reinforcing caps, can be placed in a suitable mold, impregnated with resin, such as "B" stage epoxy resin, and cured.

The thickness of the layered woven assembly produced according to the invention can range from about 0.012" to about 0.60" (about 2 to about 100 plies). However, thicker multilayered assemblies up to about 1.20" (about 200 plies) can be produced according to the invention.

Various thermosetting resins can be used in their "B" stage form for impregnating the layered assembly or woven reinforcement member of the invention, including epoxy, polyester and polyimide resins.

From the foregoing, it is seen that the invention provides for the provision of a three-dimensional noncrimp woven shaped cloth designed particularly as a reinforcement for a plastic structural member, such woven reinforcement being formed as an integral member employing warp and fill fibers, preferably of high modulus or strength, secured together by a suitable proportion of tie yarns of low modulus such as fiberglass, and avoiding the tedious and expensive prior art procedure for providing such woven reinforcements involving resin impregnating individual sheets of material, laying up of individual layers or plies of woven material on a tool with the proper fiber ply orientation pattern, followed by curing.

While particular embodiments of the invention have been described for purposes of illustration, it will be understood that various changes and modifications within the spirit of the invention can be made, and the invention is not to be taken as limited except by the scope of the appended claims.

What is claimed is:

1. In a three-dimensional multilayer woven reinforcement member for structural components having a thicker area and a divided thinner area, in which the fibers are distributed in the fabric in three different directions generally perpendicular to each other and in which the layers of warp and fill fibers in two directions form a layered assembly, the fibers of which layers do not cross the plane of adjacent layers, the upper layer and the lower layer of the assembly being composed of fill fibers, at least one tie yarn passing in a third direction through the above noted assembly of layers of warp and fill fibers, the tie yarns passing back and forth over the fill fibers of the outside layers so as to form therewith a fabric containing inner layers of warp and fill fibers; the improvement comprising providing one area of the assembly in which the layers of warp and fill fibers are tied together throughout their entire thickness, and other areas in which the above noted layers are separated into two individual groups, each group being tied in the manner set forth above by said tie yarns.

2. The integral woven reinforcement member as defined in claim 1, wherein said warp and said fill fibers are graphite, boron, fiberglass, carbon, silicon or organic fibers, and said tie yarn is fiberglass or organic fiber.

3. The integral woven reinforcement member as defined in claim 1, wherein said reinforcement member is in the shape of an I-beam, said I-beam having a web and a pair of flanges integrally attached to opposite ends of said web, each of said web and said flanges having a multiplicity of layers including a predetermined percentage of 0° (warp) fibers and 90° (fill) fibers, including a plurality of spaced tie yarns extending lengthwise of said web and said flanges.

4. The integral woven reinforcement member as defined in claim 3, wherein each of the flanges of said I-beam comprises half the number of layers in said web, said flanges comprising an extension of opposite ends of said web.

5. The integral woven reinforcement member as defined in claim 4, wherein said warp and said fill fibers are high modulus boron or graphite fibers, and said tie yarns are fiberglass or organic fiber.

6. The integral woven reinforcement member as defined in claim 3, including a woven cap in contact with the outer surfaces of each of said flanges, said caps each comprised of a plurality of layers of 0° warp fibers, and 90° tie yarn extending back and forth across the cap and securing together adjacent layers of said warp fibers.

7. The integral woven reinforcement member as defined in claim 6, said assembly of said woven reinforcement member and said caps being impregnated with a "B" stage thermosetting resin.

8. Element, according to claim 1, that is characterized by the fact that it is an I-shaped structure of which the upper and lower plies are made by folded ends of the material, additional elements of reinforcement being fixed to the ends, and additional elements being also fixed to the web of the said structure.

9. The integral woven reinforcement member as defined in claim 1, wherein said reinforcement member is in the shape of a J-section, said J-section having a web and a pair of flanges integrally attached to opposite ends of said web, said pair of flanges at one end of said web being horizontally outwardly extended, said pair of flanges at the opposite end of said web being disposed in the same direction, with one flange disposed adjacent to the other flange, each of said web and said flanges having a multiplicity of layers and including a pre-determined percentage of 0° (warp) fibers and 90° (fill) fibers, including a plurality of spaced tie yarns extending lengthwise of said web and said flanges.

10. The integral woven reinforcement member as defined in claim 9, including a woven cap disposed between the last mentioned adjacent flanges at said opposite end of said web, said caps each comprised of a plurality of layers of 0° warp fibers, and tie yarn extending back and forth across the cap and securing together adjacent layers of said warp fibers.

11. The integral woven reinforcement member as defined in claim 10, said assembly of said woven reinforcement member and said caps being impregnated with a "B" stage thermosetting resin.

12. The integral woven reinforcement as defined in claim 1, wherein said reinforcement member is in the shape of a hat section, said hat section having a semicircular web and a pair of flanges integrally attached to opposite ends of said web, said pair of flanges at opposite ends of said web being horizontally outwardly extended, each of said web and said flanges having a multiplicity of layers, and including a predetermined percentage of 0° (warp) fibers and 90° (fill) fibers, including a plurality of spaced tie yarns extending lengthwise of said web and said flanges.

13. The integral woven reinforcement member as defined in claim 12, including a woven cap in contact with the outer surfaces of each of said flanges at said opposite ends of said web, and woven caps in contact with the outer surfaces of the web at the central portion thereof, said caps comprised of a plurality of layers of 0° warp fibers, and tie yarn extending back and forth across the cap and securing together adjacent layers of said warp fibers.

14. The integral woven reinforcement member as defined in the claim 13, said assembly of said woven reinforcement member and said caps being impregnated with a "B" stage thermosetting resin.

15. The integral woven reinforcement member as defined in claim 1, wherein said reinforcement member is in the shape of a channel, said channel having a web and a pair of flanges integrally attached to opposite ends of said web, said flanges at said opposite ends of said webs being horizontally outwardly extended, each of said web and said flanges having a multiplicity of layers, and including a predetermined percentage of 0° (warp) fibers and 90° (fill) fibers, including a plurality of spaced tie yarns extending lengthwise of said web and said flanges.

16. The integral woven reinforcement member as defined in claim 15, including a woven cap in contact with the outer surfaces of each of said flanges, and woven caps in contact with the outer surfaces of the web at the caps in contact with the outer surfaces of the web at the central portion thereof, said caps comprised of a plurality of layers of 0° warp fibers, and 90° tie yarn extending back and forth across the cap and securing together adjacent layers of said warp fibers.

17. The integral woven reinforcement member as defined in claim 16, said assembly of said woven reinforcement member and said caps being impregnated with a "B" stage thermosetting resin.

18. The integral woven reinforcement member as defined in claim 1, wherein said reinforcement member is in the shape of a T-section, said T-section having a web and a pair of flanges integrally attached to one end of said web, said flanges at said one end of said web being horizontally outwardly extended, each of said web and said flanges having a multiplicity of layers, and including a predetermined percentage of 0° (warp) fibers and 90° (fill) fibers, including a plurality of spaced tie yarns extending lengthwise of said web and said flanges.

19. The integral woven reinforcement member as defined in claim 18, including a woven cap in contact with the outer surfaces of said flanges, said caps comprised of a plurality of layers of 0° warp fibers, and 90° tie yarn extending back and forth across the cap and securing together adjacent layers of said warp fibers.

20. The integral woven reinforcement member as defined in claim 19, said assembly of said woven reinforcement member and said caps being impregnated with a "B" stage thermosetting resin.

21. The integral woven reinforcement member as defined in claim 1, said member being impregnated with a "B" stage thermosetting resin.

* * * * *